(12) United States Patent
Simmons et al.

(10) Patent No.: US 10,709,060 B2
(45) Date of Patent: Jul. 14, 2020

(54) LAWN CARE VEHICLE WITH ON BOARD BATTERY CHARGING

(71) Applicant: HUSQVARNA AB, Huskvarna (SE)

(72) Inventors: Gent Simmons, Belmont, NC (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 190 days.

(21) Appl. No.: 15/745,443

(22) PCT Filed: Jul. 20, 2016

(86) PCT No.: PCT/IB2016/054321
§ 371 (c)(1),
(2) Date: Jan. 17, 2018

(87) PCT Pub. No.: WO2017/013602
PCT Pub. Date: Jan. 26, 2017

(65) Prior Publication Data
US 2018/0206401 A1    Jul. 26, 2018

Related U.S. Application Data

(60) Provisional application No. 62/195,115, filed on Jul. 21, 2015.

(51) Int. Cl.
*A01D 34/00* (2006.01)
*A01D 34/64* (2006.01)
(Continued)

(52) U.S. Cl.
CPC ........... *A01D 34/006* (2013.01); *A01D 69/02* (2013.01); *B60K 25/00* (2013.01); *H02J 7/0013* (2013.01);
(Continued)

(58) Field of Classification Search
CPC .............. A01D 34/6806; A01D 34/006; A01D 34/001; A01D 34/69; A01D 34/77;
(Continued)

(56) References Cited

U.S. PATENT DOCUMENTS 4,870,811 A    10/1989  Steele
6,675,562 B2 *  1/2004  Lawrence .......... A01D 34/6806
                                                         56/16.9
(Continued)

FOREIGN PATENT DOCUMENTS

WO    2010079301 A1    7/2010
WO    2014120912 A1    8/2014

OTHER PUBLICATIONS

International Search Report and Written Opinion for International Application No. PCT/IB2016/054321 dated Nov. 4, 2016.

*Primary Examiner* — Robert E Pezzuto
(74) *Attorney, Agent, or Firm* — Burr & Forman, LLP

(57) ABSTRACT

A riding lawn care vehicle (10) may include a power unit (20), a working element (30) configured to perform a work function, a working element driver (40) providing operable coupling between the power unit and the working element to drive the working element based on operation of the power unit, and an external charger (100) operably coupled to the working element driver to charge one or more external batteries of a device other than the riding lawn care vehicle.

20 Claims, 5 Drawing Sheets

(51) Int. Cl.
  *B60K 25/00* (2006.01)
  *A01D 69/02* (2006.01)
  *H02J 7/00* (2006.01)
  *A01D 101/00* (2006.01)

(52) U.S. Cl.
  CPC ..... *A01D 2101/00* (2013.01); *B60Y 2200/223* (2013.01)

(58) Field of Classification Search
  CPC ...... A01D 34/82; A01D 69/02; A01D 69/025; F02B 63/02; F02B 63/047; F02B 63/042; H02J 7/0013; H02K 7/1815; B60K 25/00
  USPC ....... 56/2, 16.9, 10.8, 10.6, 13.7, 13.6, 10.1; 290/1 A, 1 R
  See application file for complete search history.

(56) References Cited

U.S. PATENT DOCUMENTS

| | | | |
|---|---|---|---|
| 7,264,069 B2 * | 9/2007 | Fiorenza | A01D 34/77 180/53.7 |
| 7,318,493 B2 | 1/2008 | Medina | |
| 7,677,344 B2 | 3/2010 | Medina et al. | |
| 7,741,793 B2 | 6/2010 | Lucas et al. | |
| 7,743,590 B1 * | 6/2010 | Gidden | A01D 34/82 56/13.7 |
| 8,110,934 B2 * | 2/2012 | Gezel | H02K 7/1815 290/1 R |
| 8,159,078 B2 | 4/2012 | Usselman et al. | |
| 8,250,862 B1 | 8/2012 | Iida et al. | |
| 8,816,534 B1 | 8/2014 | Vasquez | |
| 8,863,485 B2 * | 10/2014 | Pitcel | A01D 69/025 56/10.2 R |
| 8,963,481 B2 * | 2/2015 | Prosser | B60L 53/57 320/104 |
| 2008/0161968 A1 * | 7/2008 | Adegbile | A01D 34/008 700/245 |
| 2008/0234096 A1 | 9/2008 | Joshi et al. | |
| 2012/0303259 A1 * | 11/2012 | Prosser | B60L 53/57 701/400 |
| 2013/0312384 A1 | 11/2013 | Hwang | |
| 2014/0375272 A1 | 12/2014 | Johnsen et al. | |
| 2016/0105077 A1 * | 4/2016 | Stewart | A01D 42/00 290/1 R |

\* cited by examiner

LAWN CARE VEHICLE WITH ON BOARD BATTERY CHARGING

CROSS-REFERENCE TO RELATED APPLICATIONS

This application claims the benefit of U.S. Provisional Application No. 62/195,115 filed on Jul. 21, 2015, the entire contents of which are hereby incorporated herein by reference.

TECHNICAL FIELD

Example embodiments generally relate to lawn care vehicles and, more particularly, to riding lawn care vehicles capable of charging batteries for other outdoor power equipment.

BACKGROUND

Lawn care tasks are commonly performed using various tools and/or machines that are configured for the performance of corresponding specific tasks. Whether such tasks are performed commercially or by the homeowner, lawn care is generally not an endeavor that is typically performed with a single device. Edging, trimming, mowing, brush cutting, tilling, and/or the like, may each have a corresponding different device that is tailored for performing the corresponding task. Moreover, some lawn care tasks are suited for hand-held outdoor power equipment (e.g., chainsaws, trimmers, edgers, etc.), while other tasks are better suited for walk-behind outdoor power equipment or riding lawn care vehicles.

With a plurality of devices being likely to be employed for various different activities associated with yard maintenance, it is easy to appreciate that a corresponding plurality of individual power units of such devices will need to have fuel or power from various sources. With gasoline powered devices, the answer is of course to have plenty of extra gas available to power each device. However, solutions get more difficult with electrically powered devices, particularly battery powered devices in commercial environments. While a homeowner may use mains power to charge batteries for multiple devices, there is no guarantee that a commercial lawn care provider will have access to mains power while onsite.

BRIEF SUMMARY OF SOME EXAMPLES

Some example embodiments of the present invention may therefore provide a system and device for on board battery charging. In particular, some example embodiments may enable an external charger configured to charge batteries of hand-held outdoor power equipment to be powered via power extracted from a working element driver of a riding lawn care device.

Some example embodiments may improve an operator's ability to charge the other devices that are often employed in parallel or series with the operation of a lawn mower at a given work site. The user experience and convenience associated with execution of lawn care tasks may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1:
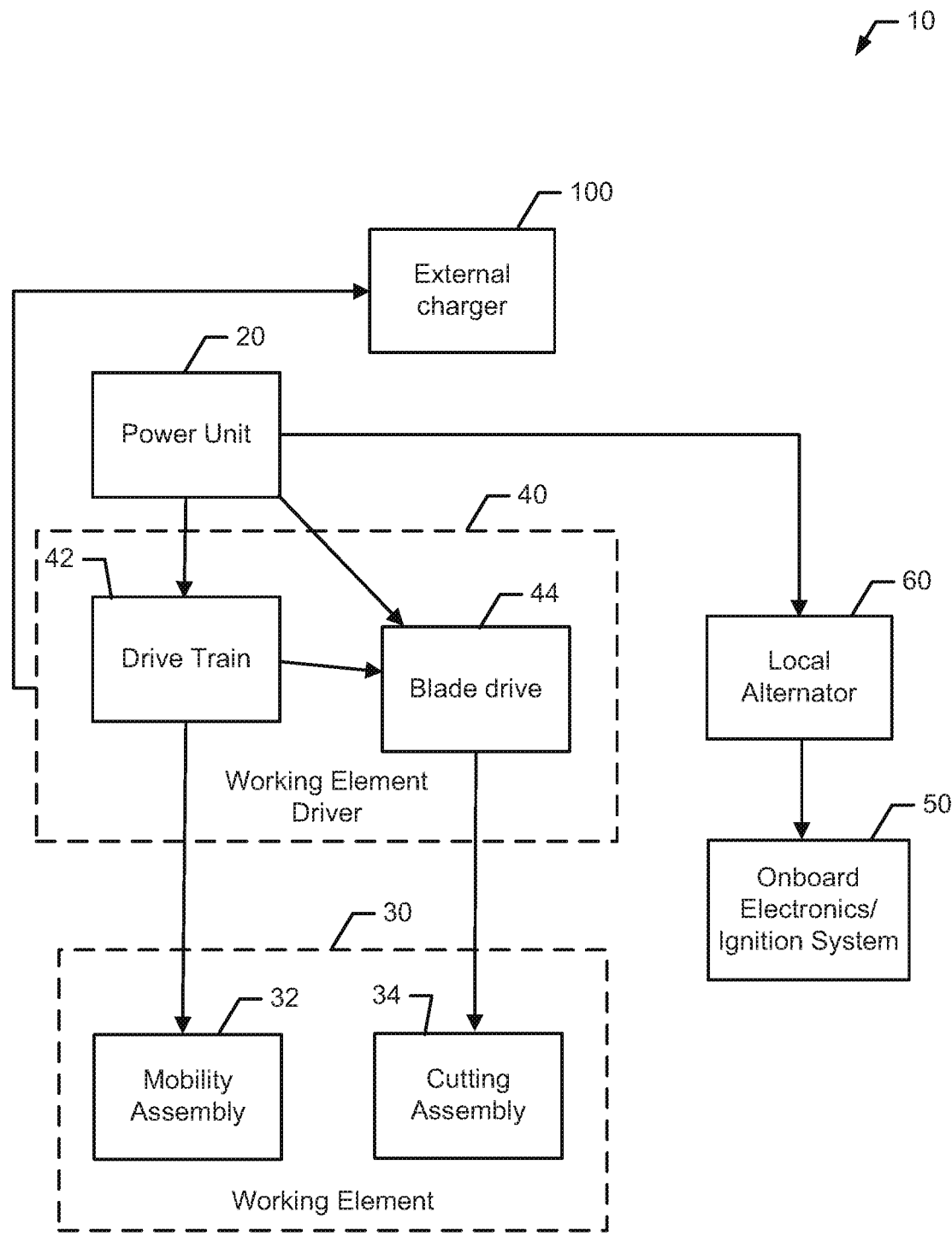
FIG. 1 illustrates a block diagram of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to employ a plurality of devices to perform lawn care tasks. In this regard, while performing mowing operations or other activities with riding lawn care vehicle, the riding lawn care vehicle may simultaneously charge one or more batteries for outdoor power equipment via an external charger that charges batteries of external devices. The batteries may be standardized power modules that are usable in many different pieces of equipment or may be batteries specific to a single piece of equipment. The external charger may draw power (e.g., parasitically) from the power unit of the riding lawn care vehicle (e.g., via the working element driver of the riding lawn care vehicle) to provide power to the external charger. The external charger may be a modular unit that can be retrofitted onto existing units or provided on production units to be configured to receive batteries for one or more types of other outdoor power equipment (e.g., hand-held outdoor power equipment). The external charger may then perform high capacity charging to quickly charge the batteries of the hand-held equipment while the riding lawn care vehicle operates. Moreover, since the external charger is provided as a modular unit, ventilation and security (e.g., a locking assembly) can be added to the external charger. The ventilation can support high capacity charging by providing cooling to the external charger, and the security features can ensure that the batteries cannot be removed from the external charger by unauthorized persons.

FIG. 1 illustrates a block diagram of a riding lawn care vehicle 10 according to an example embodiment. The riding lawn care vehicle 10 includes a power unit 20 configured to drive a working element 30 via a working element driver 40. In some example embodiments, the working element 30 may include a mobility assembly 32 and/or a cutting assembly 34. The mobility assembly 32 may include wheels, a track system or any other components that can bear at least a portion of the weight of the riding lawn care vehicle 10 and enable the riding lawn care vehicle 10 to execute powered movement over a surface based on power provided from the power unit 20. The cutting assembly 34 may include a cutting deck and/or cutting blade assembly (e.g., having one or more cutting blades) that is configured to turn based on power provided from the power unit 20.

In an example embodiment, the power unit 20 may be a gasoline engine, an electric motor, or any other suitable power generation unit for powering a riding lawn care vehicle. The working element driver 40 may therefore include any gears, belts, pulleys, shafts, and/or the like that may be employed to transfer power from the power unit 20 to the working element 30. Thus, for example, in the case of the mobility assembly 32, the working element driver 40 may include drive train 42 components configured to power the wheels of the mobility assembly 32 by selectively coupling power from the power unit 20. Meanwhile, for example, in the case of the cutting assembly 34, the working element driver 40 may include blade drive 44 components configured to power the blade(s) of the cutting assembly 34 by selectively coupling power from the power unit 20.

In some embodiments, the riding lawn care vehicle 10 may include an onboard electronic/ignition system 50. The onboard electronic/ignition system 50 may provide power for ignition of the riding lawn care vehicle 10 (e.g., via an onboard battery) and for the operation of any local electrical components (e.g., displays, lights, radio equipment, control systems, sensors, etc.). In cases where the riding lawn care vehicle 10 has an onboard battery for ignition, the onboard battery may be recharged during operation of the riding lawn care vehicle 10 by a local alternator 60. However, it should be appreciated that such recharging could, in some cases, be accomplished without specifically using an alternator. Rotating equipment may be fitted with one or more magnets to form a rotor and a stator may be applied proximate to the rotor to generate electricity for recharging the onboard battery without necessarily employing the local alternator 60.

In some cases, an outlet (e.g., similar to a household electrical receptacle) or other charging unit may be provided to enable external devices to be plugged into the outlet or batteries to be charged in the charging unit. Thus, it may be possible to power external devices or even plug in a local battery charger to such outlet. However, these outlets would typically be powered by the local alternator 60 and/or the onboard battery and therefore may not always be capable of performing high capacity or quick charging. Nor may such outlets enable secure retention and/or direct contact with the batteries being recharged. Accordingly, some example embodiments may be fitted with an external charger 100 as described herein. As shown in FIG. 1, the external charger 100 may receive power from a source/mechanism that is different from the source/mechanism by which the onboard electronics/ignition system 50 of the riding lawn care vehicle 10 is powered. Thus, the external charger 100 may receive power from a source other than the local alternator 60 and/or the onboard battery. Instead, the external charger 100 may receive power (e.g., parasitically) from the power unit 20. In an example embodiment, the external charger 100 may be powered from the working element driver 40. Thus, for example, a component of the drive train 42 or the blade drive 44 may be operably coupled to the external charger 100 to power the external charger 100.

Figure 2:
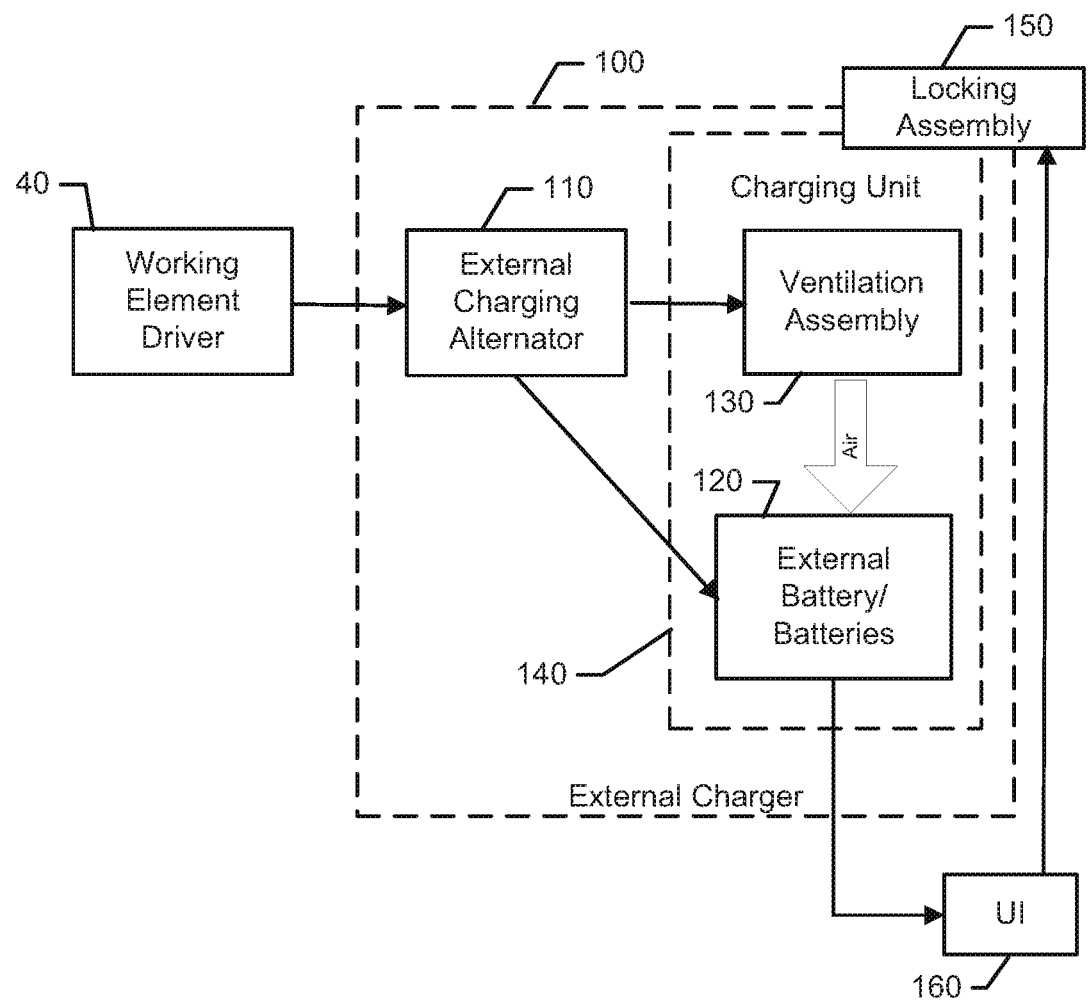
FIG. 2 illustrates a block diagram of the external charging system of the riding lawn care vehicle according to an example embodiment.

The external charger 100 is shown in greater detail in FIG. 2. In this regard, FIG. 2 illustrates a block diagram of the external charger 100 according to an example embodiment. As shown in FIG. 2, the external charger 100 may include an external charging alternator 110 that is powered from the working element driver 40. The external charging alternator 110 may convert rotational energy from a component of the working element driver 40 into electrical energy for charging one or more external batteries 120. The one or more external batteries 120 may be for one or more different types of outdoor power equipment. For example, in some cases, the one or more external batteries 120 may power hand-held outdoor power equipment (e.g., trimmers, edgers, chainsaws, blowers, and/or the like).

In an example embodiment, the external charging alternator 110 may be configured to generate a relatively high voltage necessary for high capacity charging (e.g., quick charging of greater than about 20V) of the one or more external batteries 120. In some cases, the high capacity charging may include charging of, for example, a 36V, 3.0 Ah or 40V, 4.2 Ah Lithium ion battery (or batteries) to 80% of capacity in 36 minutes, or 100% of capacity in 54 minutes. However, other batteries and rates may also be achievable in alternative embodiments. The external charging alternator 110 may be replaced with any other suitable electrical energy generator or hybrid electric generator in some embodiments. The performance of high capacity charging may generate significant amounts of heat in the one or more external batteries 120. Accordingly, some example embodiments may employ a ventilation assembly 130 to provide cooling air to the one or more external batteries 120 during charging. The ventilation assembly 130 may employ one or more fans that are configured to provide air into a charging unit 140 that may be operably coupled to the ventilation assembly 130.

In some cases, the charging unit 140 may include a housing to house or otherwise support the ventilation assembly 130 and/or the one or more external batteries 120. The housing may be a full or partial enclosure. In the case of a partial enclosure, the housing may at least have a top portion to prevent rain from reaching the one or more external batteries 120. In the case of a full enclosure, at least one side (or the top) of the housing may be removable to provide access to the charging unit 140 for insertion and removal of the one or more external batteries 120. For a full enclosure, the charging unit 140 may also include vent louvers and/or ducts for ventilation air entry/exit to ensure that the charging unit 140 is properly cooled during charging operations.

As shown in FIG. 2, in some cases the charging unit 140 may be secured using a locking assembly 150. The locking assembly 150 may be configured to, when locked, prevent access to the charging unit 140 or prevent removal of the one or more external batteries 120. In some cases, the locking assembly 150 may lock a cover from being removed until the locking assembly 150 is unlocked. The locking assembly 150 could include a pair of cooperating holes attached to each of the cover and an adjacent wall to allow a lock to be passed therethrough. The lock may have a key or a code to permit unlocking and removal of the lock to provide access to the charging unit 140. In other cases, the locking assembly 150 may not necessarily lock a cover, but may instead lock a retention strap to a sidewall or other portion of the charging unit 140. The retention strap may retain the batteries within the charging unit 140. In some cases, the retention strap may also incorporate electrodes for battery charging therein. Thus, in some cases, the retention strap may perform both a retaining function to hold the batteries and an electrical connection function.

In an example embodiment, rather than manually operating a lock, the locking assembly 150 may include a lock that incorporates a user interface (e.g., UI 160). A key code may be entered into the UI 160 and a corresponding electronically operated lock may be operated based on the key code entries or other instructions provided at the UI 160. The UI 160 may also or alternatively provide an indication of charge status of the one or more external batteries 120. Moreover, in some cases, the UI 160 may provide an alarm or indication when individual ones of the one or more external batteries 120 reach a full charge.

Figure 3:
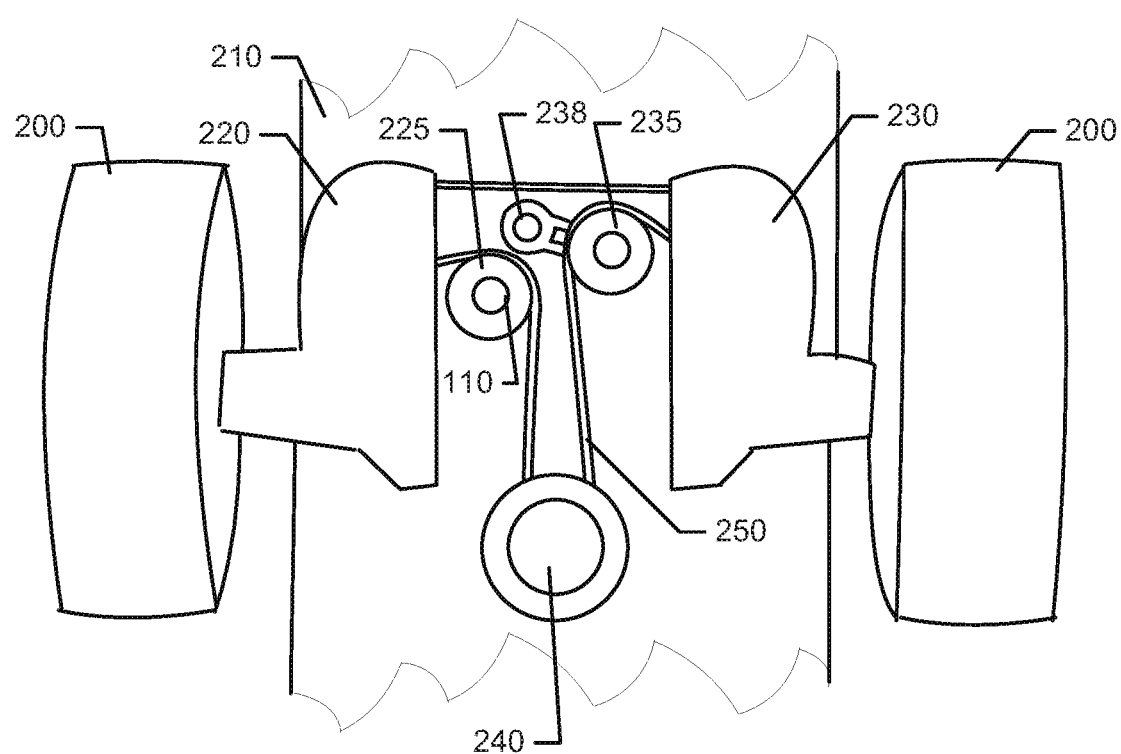
FIG. 3 illustrates a bottom view of one specific example of how the external charging system may be powered according to an example embodiment.

FIG. 3 illustrates a bottom view of one specific example of how an external charging system may be powered according to an example embodiment. In this regard, FIG. 3 relates to a riding lawn mower that would be classified as a zero turn or short turn radius mower. The view of FIG. 3 is from the bottom of the mower looking between the rear or drive wheels 200. A chassis platform 210 is provided to support a first hydrostatic drive unit 220 and a second hydrostatic drive unit 230. The first and second hydrostatic drive units 220 and 230 are independently operable, but are powered by the same source (e.g., a drive pulley 240) operably coupled to the engine (or power unit) of the mower. The first and second hydrostatic drive units 220 and 230 allow the corresponding drive wheels 200 to be independently operated in forward or reverse directions to control the movement of the mower. The drive wheels 200 are therefore an example of the mobility assembly 32 of FIG. 1, and the first and second hydrostatic drive units 220 and 230 along with the drive pulley 240 are example components of the drive train 42.

As shown in FIG. 3, the first and second hydrostatic drive units 220 and 230 may be operably coupled to the drive pulley 240 via a belt 250 (e.g., a hydro pump belt). The belt 250 may be operably coupled to the first and second hydrostatic drive units 220 and 230 via a first pulley 225 and a second pulley 235, respectively, for routing/tensioning the belt 250. In some cases, one of the first pulley 225 and the second pulley 235 may be fixed or idler pulley (e.g., the first pulley 225) and the other may be movable with spring loading element 238 (e.g., the second pulley 235) to adjust belt tension. In such an example, as one way the working element driver 40 may be operably coupled to drive the external charger 100, the first pulley 225 may be replaced with a pulley having an alternator (e.g., external charging alternator 110) operably coupled thereto. Alternatively, the external charging alternator 110 may be connected to the first pulley 225 to rotate therewith (e.g., about the axis of the first pulley 225). In either case, the external charger 100 may receive electrical energy generated by the external charging alternator 110 responsive to rotation of the first pulley 225 (via belt 250 and drive pulley 240) for charging the one or more external batteries 120. Thus, in this example, the first pulley 225 may perform dual functions of routing the belt 250 and turning the external charging alternator 110.

As can be appreciated from the description above, the external charger 100 may be employed on any of a number of different types of riding lawn care vehicles. Lawn tractors, zero turn mowers, stand-on mowers, and/or the like, each require a relatively robust power unit 20 and have correspondingly powered mobility assemblies and/or cutting assemblies with corresponding working element drivers that could be used for operable coupling to the external charger 100. With a robust power unit 20, parasitic charging using a high capacity charging unit (e.g., charging unit 140) may be possible. Moreover, providing the charging unit 140 to charge batteries of hand-held equipment that is currently being used (or will be used) at the same or a subsequent property where the riding lawn care vehicle 10 is being operated may provide a relatively convenient and efficient way to power such devices.

Given that the charging unit 140 may be a relatively self contained charging module, the charging unit 140 could be mounted to any desirable type of riding lawn care vehicle 10 during production or as an after market feature. As such, the external charger 100 may be marketed, produced and/or sold as a retrofit unit (or kit), or as a self contained unit for addition to mowers during or immediately after production. In some cases, the kit may include a replacement pulley (e.g., for the first pulley 225) that includes the external charging alternator 110 and directions for coupling the external charging alternator 110 to the charging unit 140. However, other specific coupling components may be included in various alternatives.

Figure 4:
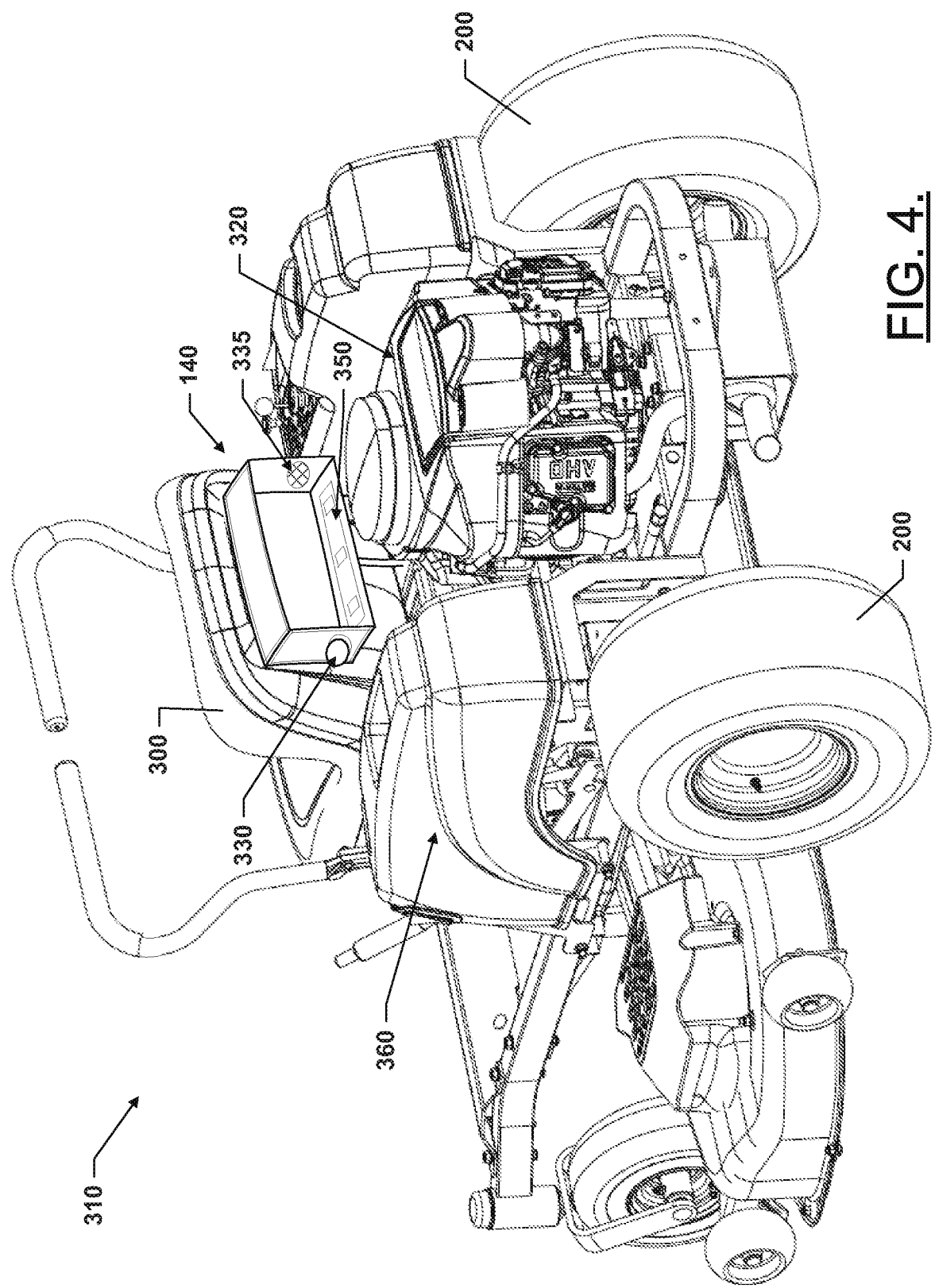
FIG. 4 illustrates a rear perspective view of a riding lawn care vehicle having the external charging system according to an example embodiment.

FIG. 4 illustrates one example of the charging unit 140 added behind a seat 300 of a zero turn mower 310. The charging unit 140 may therefore be proximate to the engine 320 of the zero turn mower 310 to enable the charging unit 140 to be operably coupled to the external charging alternator (not shown in FIG. 4). In this example, a back panel of the charging unit 140 is either removed or not included so that the inside of the charging unit 140 can be accessed to insert batteries therein for charging. Vent fans 330 are shown to draw air into the charging unit 140 via louvers 335 in one of the walls (e.g., the sidewall) of the charging unit.

In some cases, an electrode strap 350 (or one or more electrode plates) may be provided at a base or in some way operably coupled to a base of the charging unit 140. The electrode strap 350 may include one or more electrodes to operably couple to corresponding battery electrodes of the batteries to be charged in the charging unit 140. Another electrode plate or strap may be operably coupled to the other electrodes of the batteries to be charged as well to complete the configuration for charging. The electrode straps may be configured to mate with the corresponding battery types that are to be charged. Moreover, in some cases, adaptor units may be coupled to the electrode straps to allow the electrode straps to be used for charging batteries of various different (perhaps proprietary) types. As indicated above, at least one of the adaptor straps may be lockable in addition to or as an alternative to locking the charging unit 140.

Although FIG. 4 shows the charging unit 140 being attached or otherwise positioned rearward of the seat 300, it should be appreciated that alternative locations could be provided in other examples. For example, the charging unit 140 could alternatively be mounted on or in a side console 360 or directly above the engine 320. Additionally, other alternative locations could be employed when the charging unit 140 is provided on other example vehicles.

Figure 5:
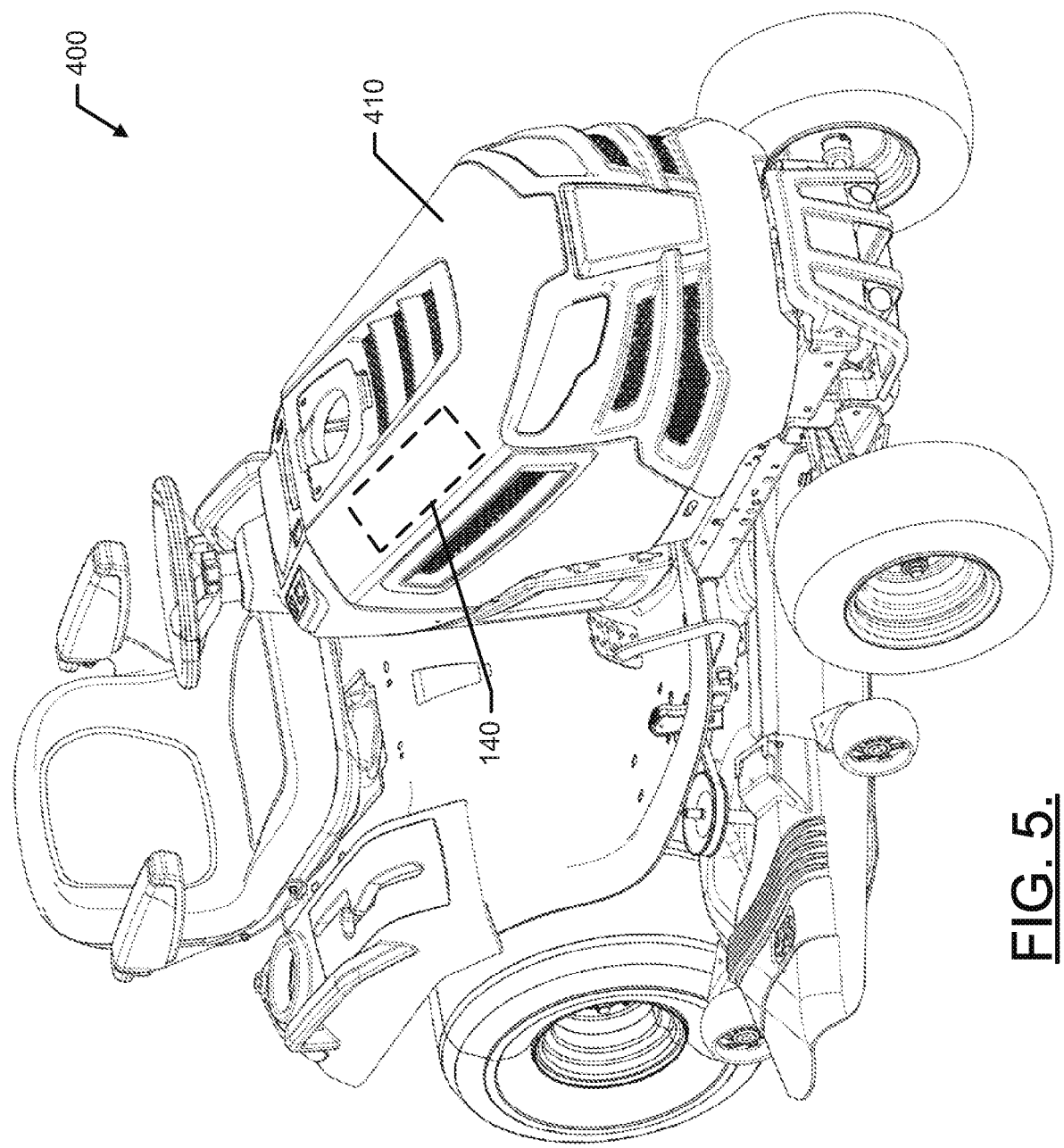
FIG. 5 illustrates a front perspective view of an alternative location for the external charging system in accordance with an example embodiment.

In this regard, FIG. 5 illustrates a front perspective view of an alternative location for the charging unit 140 in accordance with another example embodiment. In this regard, FIG. 5 illustrates a lawn tractor 400 with a hood 410. The charging unit 140 is shown in dashed lines in FIG. 5 since the charging unit 140 is under the hood 410. By placing the charging unit 140 under the hood 410, the charging unit 140 does not necessarily need to have a top cover or any other walls to protect the batteries being charged from weather. Instead, the hood 410 of the lawn tractor 400 may provide any needed weather protection. The charging unit 140 of this example may be charged from the local alternator (or generator) (e.g., local alternator 60) of the lawn tractor 400 or, as described above, by parasitically extracting power from one or more components of the working element driver 40.

Accordingly, some example embodiments may enable multiple batteries to be charged during operation of a riding lawn care vehicle. In an example embodiment, a riding lawn care vehicle may therefore be provided. The vehicle may include a power unit, a working element configured to perform a work function, a working element driver providing operable coupling between the power unit and the working element to drive the working element based on operation of the power unit, and an external charger operably coupled to the working element driver to charge one or more external batteries of a device other than the riding lawn care vehicle.

The riding lawn care vehicle (or the external charger) of some embodiments may include additional features that may be optionally added either alone or in combination with each other. For example, in some embodiments, the device may be a hand-held power tool. In some embodiments, the external charger may be parasitically charged by taking power from a component of the working element driver. In an example embodiment, the working element driver may include a drive train operably coupling the power unit to a mobility assembly of the working element. In some cases, the working element driver may include a pulley operably coupling a hydrostatic drive unit to a drive pulley of the power unit via hydro pump belt. In some embodiments, the working element driver may include a blade drive operably coupling the power unit to a cutting assembly of the working element. In an example embodiment, the power unit may be a gasoline engine. In some cases, the riding lawn care vehicle may include an onboard electronics/ignition system, and the external charger may receive power from a source different than that which powers the onboard electronics/ignition system. In some embodiments, the onboard electronics/ignition system may be powered by a local alternator, and the external charger may be powered by an external charging alternator. In an example embodiment, the charging unit may include a ventilation assembly configured to provide cooling air to the one or more external batteries. In some cases, the charging unit may include a locking assembly configured to restrict access to the one or more external batteries based on a state of the locking assembly. In some embodiments, the state of the locking assembly may be changed via a key or code entry. In an example embodiment, the charging unit may include a housing operably coupled to a seat of the riding lawn care vehicle. In some cases, the housing may enclose one or more electrode plates configured to interface with the one or more external batteries. In some embodiments, at least one of the electrode plates may be lockable relative to another of the electrode plates or the housing. In an example embodiment, an adapter may further be provided to configure the electrode plates to interface with at least one different type of external battery. In some cases, the charging unit may include a removable kit that is configured to be fitted on a selected riding lawn care vehicle including an external charging alternator.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
   a power unit;
   a working element configured to perform a work function;
   a working element driver providing operable coupling between the power unit and the working element, the working element driver being configured to drive the working element responsive to operation of the power unit; and
   an external battery charger operably coupled to, and powered by, the working element driver, the external battery charger being configured to charge an external battery of a device other than the riding lawn care vehicle;
   wherein the external battery charger comprises an enclosure with a plurality of electrode plates disposed on an internal base of the enclosure, the electrode plates being configured to mate with battery electrodes of the external battery.

2. The riding lawn care vehicle of claim 1, wherein the external battery charger is parasitically charged by taking power from a component of the working element driver.

3. The riding lawn care vehicle of claim 1 further comprising a seat;
   wherein the power unit is disposed rearward of the seat; and
   wherein the enclosure is positioned rearward of the seat and forward of the power unit.

4. The riding lawn care vehicle of claim 1, wherein the device comprises a hand-held power tool.

5. The riding lawn care vehicle of claim 1, wherein the working element driver comprises a blade drive operably coupling the power unit to a cutting assembly of the working element.

6. The riding lawn care vehicle of claim 1, further comprising an onboard electronics/ignition system, and wherein the external battery charger receives electrical power from a source different than that which provides electrical power to the onboard electronics/ignition system.

7. The riding lawn care vehicle of claim 6, wherein the onboard electronics/ignition system is powered by a local alternator, and wherein the external battery charger is provided electrical power by an external charging alternator having a different axis of rotation from an axis of rotation of the power unit.

8. The riding lawn care vehicle of claim 1, wherein the enclosure is configured to receive the external battery.

9. The riding lawn care vehicle of claim 1, wherein the enclosure sure comprises a ventilation assembly configured to provide cooling air to the external battery.

10. The riding lawn care vehicle of claim 1, wherein the enclosure comprises a locking assembly configured to restrict access to the external battery based on a state of the locking assembly.

11. The riding lawn care vehicle of claim 10, wherein the state of the locking assembly is changed via a key or code entry.

12. The riding lawn care vehicle of claim 3, wherein the enclosure is directly attached to a rear side of the seat of the riding lawn care vehicle.

13. The riding lawn care vehicle of claim 1, wherein the power unit comprises a gasoline engine.

14. A riding lawn care vehicle comprising:
a power unit;
a working element configured to perform a work function;
a working element driver providing operable coupling between the power unit and the working element, the working element driver being configured to drive the working element responsive to operation of the power unit; and
an external battery charger operably coupled to, and powered by, the working element driver, the external battery charger being configured to charge an external battery of a device other than the riding lawn care vehicle;
wherein the working element driver comprises a drive train operably coupling the power unit to a mobility assembly of the working element;
wherein the working element driver comprises a belt that operably couples a drive pulley to a drive train drive unit, the working element driver further comprising a belt routing pulley that is operably coupled to the belt between the drive pulley and the drive train drive unit;
wherein the external battery charger comprises an external charging alternator configured to generate electrical energy for charging the external battery, the external charging alternator being connected to the belt routing pulley to rotate with the belt routing pulley about an axis of rotation of the belt routing pulley.

15. An external battery charger comprising:
a housing configured to be operably coupled to a portion of a riding lawn care at a position rearward of a seat of the lawn care vehicle and forward of an engine of the lawn care vehicle, the housing being configured to receive an external battery within the housing during charging of the external battery, wherein a cooling fan is disposed in a sidewall of the housing for cooling the external battery during charging;
a charging unit configured to charge the external battery, the external battery being configured to power a device other than the riding lawn care vehicle,
wherein the external battery charger is operably coupled to a power unit of the riding lawn care vehicle via a working element driver, the working element driver providing operable coupling between the power unit and a working element configured to perform a work function to drive the working element based on operation of the power unit.

16. The external battery charger of claim 15, wherein the housing encloses an electrode plate configured to interface with the external battery.

17. The external battery charger of claim 16, wherein the electrode plate is lockable relative to a second electrode plate or the housing.

18. The external battery charger of claim 16, further comprising an adapter to configure the electrode plate to interface with at least one different type of external battery.

19. The external charger of claim 15, wherein the housing and the charging unit comprises a removable kit that is configured to be fitted on a selected riding lawn care vehicle comprising an external charging alternator.

20. The external battery charger of claim 15, wherein the housing is directly attached to the seat of the riding lawn care vehicle.

* * * * *